United States Patent [19]

Maresca, Jr. et al.

[11] Patent Number: 5,078,006
[45] Date of Patent: Jan. 7, 1992

[54] METHODS FOR DETECTION OF LEAKS IN PRESSURIZED PIPELINE SYSTEMS

[75] Inventors: Joseph W. Maresca, Jr., Sunnyvale, Calif.; James W. Starr, Bound Brook, N.J.; Christopher P. Wilson, La Honda, Calif.

[73] Assignee: Vista Research, Inc., Mountain View, Calif.

[21] Appl. No.: 575,085

[22] Filed: Aug. 30, 1990

[51] Int. Cl.$^5$ .......................................... G01M 73/299
[52] U.S. Cl. ........................ 73/40.5 R; 73/40; 73/49.2
[58] Field of Search .................. 73/40, 40.5 R, 49.2 R

[56] References Cited

U.S. PATENT DOCUMENTS

| | | | |
|---|---|---|---|
| 3,748,898 | 7/1973 | Hellouin de Menibus | 73/40 |
| 4,590,793 | 5/1986 | Staats, Jr. | 73/40.5 R |
| 4,608,857 | 9/1986 | Mertens et al. | 73/40.5 R |
| 4,646,560 | 3/1987 | Maresca, Jr. et al. | 73/49.2 |
| 4,918,968 | 4/1990 | Hoffman | 73/40.5 R |

Primary Examiner—Hezron E. Williams
Assistant Examiner—Craig Miller
Attorney, Agent, or Firm—Rosenblum, Parish & Bacigalupi

[57] ABSTRACT

A method of determining the presence and temperature compensated volumetric flow rate of leaks in fluid pressurized pipelines. The pipeline is maintained at a first pressure and the fluid volume change per unit time is calculated. The pressure is then maintained at a second different pressure and a second fluid volume change per unit time is calculated. The system is then maintained at the first pressure while a third fluid volume change per unit time is calculated. The first and third rates are combined with the second rate to obtain a temperature compensated leak volumetric flow rate.

9 Claims, 11 Drawing Sheets

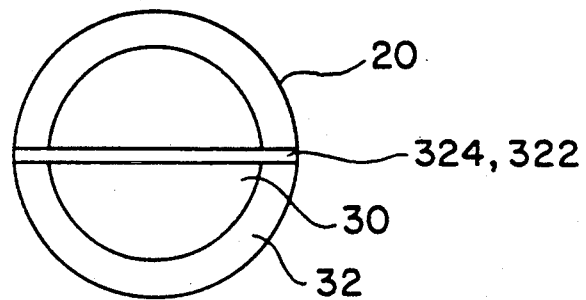
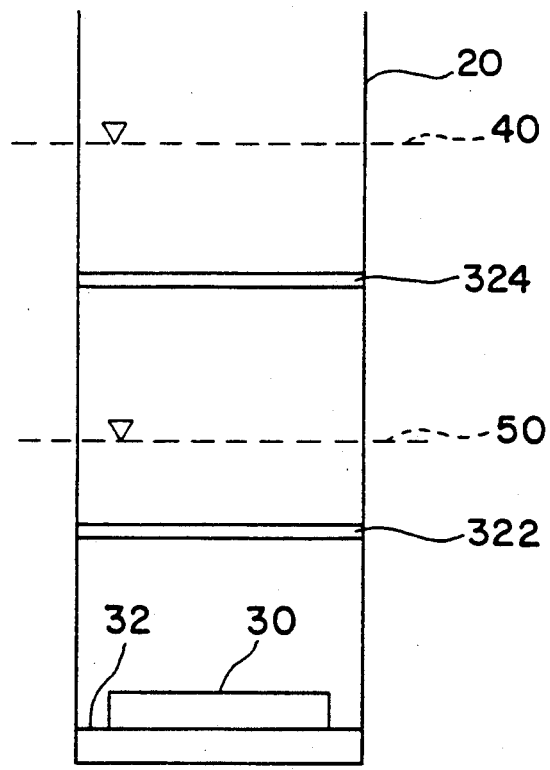

METHODS FOR DETECTION OF LEAKS IN PRESSURIZED PIPELINE SYSTEMS

1 BACKGROUND OF THE INVENTION

1.1 Field of the Invention

The present invention relates generally to a method and an apparatus for the reliable detection and quantification of the flow rate produced by a leak from pressurized pipeline systems containing petroleum, solvent, or other chemical liquids.

1.2 Brief Discussion of the Prior Art

There are a wide variety of pressurized pipeline systems carrying petroleum, solvents, and other chemical products that may contaminate or seriously damage the surrounding environment in the event of a leak. In underground or underwater pipelines, where visual inspection is not possible, a leak can be a significant problem. Small leaks in these pipeline systems (e.g., several tenths of a gallon per hour) can go undetected for long periods of time and result in a large cumulative release of product into the soil or groundwater, or into fresh or ocean water.

The need for leak detection capability in pressurized pipelines associated with underground storage tanks containing petroleum products has recently been identified. This need is an important one because the number of tanks involved is very large, and so is the volume of product dispensed through the pipelines associated with these tanks. The pipeline systems in question are most commonly made of steel or fiberglass; they are typically 2 in. in diameter, 50 to 200 ft long, buried 1.5 to 3 ft below grade, and are pressurized at 20 to 40 psi while product is being dispensed. In September 1989, the United States Environmental Protection Agency (EPA) issued technical standards for the detection of leaks in underground storage tanks containing petroleum or other hazardous chemicals and solvents. This regulation established the minimum performance standards that must be met by any leak detection system designed for testing the integrity of underground tanks and/or the pressurized pipelines associated with these tanks.

The EPA requires that underground storage tank (UST) pipeline systems that contain petroleum products be tested for leaks either on a monthly or an annual basis. To satisfy the criterion for monthly testing, a system must have the capability to detect leaks as small as 0.2 gal/h with a probability of detection ($P_D$) of 0.95 and a probability of false alarm ($P_{FA}$) of 0.05. To satisfy the criterion for annual testing, a system must be capable of detecting leaks as small as 0.1 gal/h with the same $P_D$ and $P_{FA}$ required of the monthly test.

There have been a number of approaches to leak detection in pipeline systems. Some leak detection systems are designed to operate while product is being moved through the line; others require that the flow of product be stopped for the duration of a test. Leak detection systems generally use one of three methods: they measure the drop in pressure in the pipeline over a period of time, they measure the difference in pressure or flow rate at two or more points along the pipeline, or they measure the change in the volume of the product over a period of time. Detecting small leaks is difficult because there are many physical phenomena present in pressurized pipeline systems that produce pressure, volume, and flow-rate fluctuations that are as large as or larger than those produced by a leak. These normally occurring fluctuations degrade the performance of the leak detection system and result in false alarms or missed detections. As a consequence, a number of compensation schemes have been proposed to reduce them.

1.2.1 Pipeline Leak Detectors That Measure

The most common approach to the detection of leaks in a pressurized underground pipeline containing an incompressible fluid at rest is to relate the pressure drop in the line to the flow rate of the leak. A leak in the line is declared if the pressure drops by a specified amount over a given period. If this specified amount, or threshold, is not exceeded, the line is declared tight. Pressure tests are very difficult to interpret because the pressure drops are coupled with the properties of the pipeline itself. Thus, a similar pressure drop in two different pipeline systems should not necessarily be interpreted in the same way. Experimental measurements with controlled leaks indicate that (1) the pressure decreases exponentially with time as product is released from a line, (2) the volume released from a line decreases linearly with pressure when no vapor is trapped in the line, and (3) the leak rate decreases exponentially with pressure. The relationships between pressure and (1) volume, (2) leak rate, and (3) time are controlled by the elasticity of the pipeline system. The properties of the line are usually measured in terms of the bulk modulus, which is the inverse of the elasticity constant. As the elasticity of the line increases, the time required for the pressure to decay from the operating pressure of the line to zero (or to any other pressure below the operating pressure) increases. In one line it might take 15 min for the pressure to drop 10 psi when there is a leak of 0.1 gal/h (defined at the operating pressure of the line), while in another line it might take 60 min. If the length of the test is defined as 15 min, the test protocol will prevent the sensor from detecting a 0.1-gal/h leak in some of the lines that are tested.

Some of the pressure changes that occur in pressurized pipelines are not associated with a leak. The most important are those associated with the thermal expansion or contraction of the liquid, the trapped vapor, and the pipe material itself. Experimental measurements in underground pipeline systems containing petroleum indicate that the pressure changes are directly proportional to the temperature changes and the bulk modulus of the pipeline system. These temperature-induced pressure changes occur frequently in both leaking and non-leaking pipelines. When the pressure changes in a leaking pipeline are no greater than these normally occurring temperature-induced changes, it is difficult to detect a leak by monitoring the line for drops in pressure.

Accurate detection of a leak demands (1) that both the instrumentation and protocol have sufficient sensitivity to detect the smallest leaks of interest, (2) that the temperature changes in the line be measured and compensated for, and (3) that the pressure changes be related to the flow rate of the leak. All three require that the range of the elasticity properties of the pipelines that will be tested be known. The second requires that the temperature of the product be measured. The third requires that the pressure-volume relationship be measured each time for each line being tested.

1.2.1.1 Bulk Modulus

The bulk modulus of a pipeline is defined by the relationship between pressure and volume within that line. The bulk modulus of both the line and the product must be known before one can convert the pressure and temperature changes to volume changes or before one can interpret the meaning of a pressure drop. One can estimate the bulk modulus by simultaneously measuring the pressure of the line and the volume of product released through a valve in the line. Errors in determining this relationship occur if the line is leaking, if the temperature of the product in the line is changing, or if vapor or air is trapped in the line. Accurate calibration is difficult because the integrity of the line is unknown, as are the temperature of the product in the line and the volume of trapped vapor. Furthermore, the bulk modulus of the pipeline system changes over time as the volume of trapped vapor and air changes, and as the elasticity of the flexible hosing, the mechanical leak detector, and the pipe material changes.

1.2.1.2 Thermally Induced Pressure Changes

Thermally induced fluctuations in pressure are the major source of error in detecting a liquid leak with a pressure detection system. The magnitude of the error depends on the magnitude of the coefficient of thermal expansion and the bulk modulus of the liquid and the line material. For gasoline motor fuels, whose coefficient of thermal expansion is 6 to 7 times larger than that of water, even small temperature changes have been shown to produce large pressure changes (e.g., a 0.1° C. fluctuation in temperature can cause the pressure to change by 10 psi). Furthermore, both theoretical and experimental analysis demonstrate that the rate of change of temperature in an underground pipeline system can be high and complicated.

From the standpoint of petroleum-dispensing operations, it is difficult to distinguish temperature-induced pressure changes from those that are leak-induced, because the rate of change of pressure varies exponentially both with the volume of product released through a hole in the line and with the change in the temperature of the product. The temperature of the product varies exponentially when product from the tank is brought into the line, because the temperature of this product differs from the temperature of the backfill and soil around the pipeline. This temperature difference, which can be many degrees, results in an exponential change as the product in the line attempts to come into equilibrium with its surroundings. In lines that are 100 to 200 ft long and 2 in. in diameter, it may be 6 to 12 h before the rate of change of temperature is low enough to permit accurate testing.

The traditional methods of compensating for temperature effects, which require the measurement of the rate of change of temperature of the liquid and the pipeline, are impractical because (1) the temperature distribution of the product in the line is spatially inhomogeneous, and a large number of temperature sensors would have to be retrofitted along the line in order to measure it; and (2) installing, maintaining, and calibrating a large number of sensors would be difficult. The best method of compensating for the effects of temperature fluctuations is to wait until these fluctuations are small enough to be negligible. For accurate pressure tests, this waiting period should be between 6 and 12 h.

1.2.1.3 Summary

Detecting small leaks in a pressurized pipeline by monitoring the pressure changes in the line is very difficult. High performance requires (1) that the test be long enough to allow the pressure to drop by a specified amount, suitable for detecting the smallest leaks of interest over the full range of pipeline systems to be tested, and (2) that the waiting period between the last dispensing of product and the beginning of the test be long enough for the temperature changes in the line to become negligibly small. To obtain accurate results in the case of the 2-in.-diameter lines found at a typical retail service station, dispensing operations might have to be terminated up to 12 h before beginning the test. Thus, the total time required to conduct a test becomes quite long.

1.2.2 Pipeline Leak Detectors That Attempt to Compensate for Thermal Changes In U.S. Pat. No. 4,608,857, Mertens describes a method for detecting leaks as small as 1 L/h in a pressurized pipeline without waiting for fluctuations in the temperature of the product to subside. (As we have seen, such fluctuations induce pressure changes that can be mistaken for a leak.) Mertens establishes three measurement periods of equal length. Initial line pressure is the same during the first and third periods but is lower during the middle period. Pressure changes are measured during all three periods. The middle measurement is then subtracted from the average of the first and third. The difference is compared to a threshold, and in this way the existence of a leak is determined. Mertens indicates that the volume of product in the line must be small for the method to work properly. Furthermore, according to Mertens, the method accurately compensates for temperature providing that "the sum of the consecutive measurement periods is very small compared to the half value period of a temperature equalization process."

Analysis of this method shows that, when a leak is present in the line, the average pressure change that occurs during either the first or third periods will always be greater than that during the middle period. Furthermore, depending on the bulk modulus of the pipeline system, the actual volume change that occurs during these measurement periods will vary from one leaking line to another, even when these lines have the same initial starting pressures and identical leaks. Mertens's method does not require that the bulk modulus be measured and does not attempt to interpret the test results in terms of the actual leak rate. Mertens's method declares a leak in the pipeline if the difference between the high- and low-pressure measurements exceeds a predetermined threshold value. However, a wide range of volume changes could produce this same pressure change, and therefore, the accuracy of his method will vary from line to line.

1.2.3 Pipeline Leak Detectors That Attempt to Detect Leaks While There Is Flow in the Line The method described by Mullen in U.S. Pat. No. 3,702,074 detects leaks in pressurized pipelines while product is flowing through the line. Mullen measures flow rate at two different points along the line (either the inlet and the outlet or any other two points sufficiently distant from one another) and at two different pressures, one high and one low. The difference in flow rate between the two measurements made at the lower pressure is subtracted from the difference between the same measurements made at the higher pressure. The result is then compared to a threshold leak rate, which, if exceeded, is the basis for declaring a leak in the pipeline. Mullen contends that because his measurements are closely spaced in time, he prevents long-term dynamic trends, such as those produced by the thermal expansion and contraction of the product, from affecting the results. However, while the temperature changes, the rate of change remains the same. For example, if measurements are made one minute apart the temperature change is much less than if they are made one hour apart; however, the rate of change is the same over any interval, whether it is a minute or an hour. Mullen's approach does not work because it confuses the rate of change with the actual change, which has no bearing on the results. Mullen's method will effectively compensate for temperature changes only if they happen to be the same during the high- and low-pressure measurements. This is unlikely to be the case, however, because, as stated above, the change in temperature in a pipeline is generally not constant (i.e., it tends to be exponential with time). Furthermore, the fact that Mullen does not account for inventory changes also affects the accuracy of his method. Mullen minimizes short-term transient effects, such as those due to pressure, by taking several readings at each pressure and averaging them. By isolating different sections of line and by repeating the test at each segment of the line, he can locate the leak. He eliminates false alarms due to faulty equipment by comparing the test results for each segment of pipe tested; if the equipment is faulty, the flow-rate threshold will be exceeded in all of the segments tested.

2 SUMMARY OF THE INVENTION

It is an object of this invention to provide a method, and a device, for the reliable detection of small leaks in pressurized pipelines containing liquids, including water, petroleum, solvents, and other chemical products.

Another object of this invention is to provide a method of and a device for quantitatively estimating the volume change and the flow rate of a leak in a pipeline at any pressure in the line.

Yet another object of this invention is to provide a method of and a device for compensating for the thermal expansion and contraction of the product in the pipeline and of the pipeline itself.

A further object of this invention is to provide a method of and a device for quantitatively estimating the thermally induced volume change and flow rate of the product in a pipeline at any pressure in the line.

The invention is designed to detect small leaks in pipelines that contain any type of incompressible liquid and that are either pressurized or can be placed under pressure for the duration of a test. The invention is particularly useful in underground or underwater pipeline systems, but can also be used on pipeline systems located above ground, such as those found in buildings or placed in specialized containment systems. The major application of this invention is for the detection and quantification of the flow rate produced by a leak in UST pipeline systems containing petroleum and other chemical products.

The invention requires that a leak detection test of the line be performed when the fluid in the line is at rest. Because the device will compensate for thermally induced changes in the pressure or volume of the product during a test, it is particularly useful for liquids that have a high coefficient of thermal expansion compared to water.

All references to the pressure of the pipeline system or pressure vessel made in this specification refer to gauge pressure. When the gauge pressure of the pipeline system is zero, the absolute pressure of the pipeline system is equal to atmospheric pressure. The claims made in this patent are based on absolute pressure. Thus, when the pressure is atmospheric, the gauge pressure of the pipeline system is zero.

Briefly, the preferred embodiment of the present invention is an automated system that includes a probe assembly
a high-performance check valve and a flow switch, both mounted on the pipeline
a container in which to collect and store product withdrawn from the probe assembly during a test
a valve that allows communication between the probe assembly and the pipeline system
a valve, located between the probe assembly and the storage container, that allows product to be withdrawn from the probe
a transducer controller located near the probe assembly
an external system controller in electrical communication with the transducer controller The probe assembly includes a cylindrical pressure vessel whose diameter and length are such that a constant pressure within a specified value can be maintained at each of two pressure levels during a test
an acoustic sensor system for measuring level changes during a test
a valve, located at the bottom of the pressure vessel, that allows product to be withdrawn for calibration (i.e., to determine the relationship between pressure and volume)
a valve located near the top of the pressure vessel for establishing the liquid levels at a pressure of approximately zero and at a higher pressure, which is usually the operating pressure of the pipeline The acoustic sensor subsystem, contained within the probe assembly, includes two fiducials (acoustically reflective targets) that are fixed to a permanent mount and located at a known distance from the acoustic transducer. The first fiducial is positioned such that when the pressure within the vessel is zero the fiducial will be as close as possible to, but still below, the surface of the liquid. The second fiducial is positioned so that the same is true when the pressure is at the higher level specified for a test. The purpose of the fiducials is to compensate for thermally induced changes in the speed of sound. The acoustic sensor subsystem measures the minute changes at each of two levels of product within the pressure vessel. The transducer located at the bottom of the pressure vessel sends an acoustic pulse to the surface and to the fiducial located immediately below the surface and receives both returns. The transducer controller powers the transducer and collects and reduces the data before sending it to the system controller for leak detection analysis. The system controller manages the subsystems necessary to conduct a leak detection test and to analyze the data. When the valve between the pipeline and the probe assembly is open, the pressure in the probe assembly is the same as that in the pipeline. The level of the liquid in the pressure vessel rises until the pressure within the vapor space is the same as the pressure in the pipeline. The pressure in the pipeline is dropped to zero by lowering the level in the pressure vessel. The method works as follows:

A test is divided into three consecutive segments of equal length.

During the first and third segments, the level of the product in the pressure vessel changes until the pressure in the vapor space is equal to the line pressure. If the pressure in the vessel is less than that in the line, liquid from the pipeline is allowed to enter the pressure vessel, raising the level of liquid and therefore the pressure. During the second segment, liquid is allowed to drain from the vessel, lowering the level, and therefore the pressure, until the latter is zero or near zero.

Measurements are made at a pressure higher than zero, usually the operating pressure of the line, during the first and third segments, when the level of the product in the pressure vessel is highest, and at zero pressure during the second segment, when the level of the product in the pressure vessel is lowest.

The average rate of change of the level in the probe assembly is computed by fitting a line to the level data obtained during each segment.

The rate of change of level during the second segment (zero pressure measurement) is subtracted from an average of the rate of change of level obtained during the first and third segments.

This temperature-compensated level change is then converted to a volume change, which provides a direct measurement of the leak rate referenced to the operating pressure, because the volume changes due to temperature have been removed by the differencing scheme.

If the measured leak rate exceeds a predetermined threshold volume rate, the test is repeated twice more. If the threshold is exceeded in the last two tests, the pipeline is declared leaking.

3 BRIEF DESCRIPTION OF THE DRAWINGS

FIG. 1 illustrates the preferred embodiment of the present invention, in which an acoustic sensor system located inside a pressure vessel measures product-level changes and in which the vapor space above the product is used to maintain constant pressure during a leak detection test;

FIGS. 2(a) and 2(b) show side and top views of the preferred embodiment of the acoustic sensor system;

FIGS. 3(a) and 3(b) show side and top views of an alternative embodiment of the acoustic sensor system;

FIGS. 4(a) and 4(b) show four possible shapes for the cross section of the bar-shaped fiducial, the preferred triangular shape and three alternatives (rectangular, half-circular and circular);

FIGS. 5(a) and 5(b) show side and top views of a second alternative embodiment of the acoustic sensor system;

FIG. 6 shows an alternative embodiment of the pipeline leak detection system in which the acoustic sensor system housed inside the pressure vessel shown in FIG. 1 has been replaced by an electromagnetic sensor system attached to a float that rests on the product surface.

FIGS. 7(a) and 7(b) show side and top views an alternative placement of the electromagnetic sensor, in this case outside and along the neck of the pressure vessel;

4 DESCRIPTION OF THE PREFERRED EMBODIMENT

Figure 1:
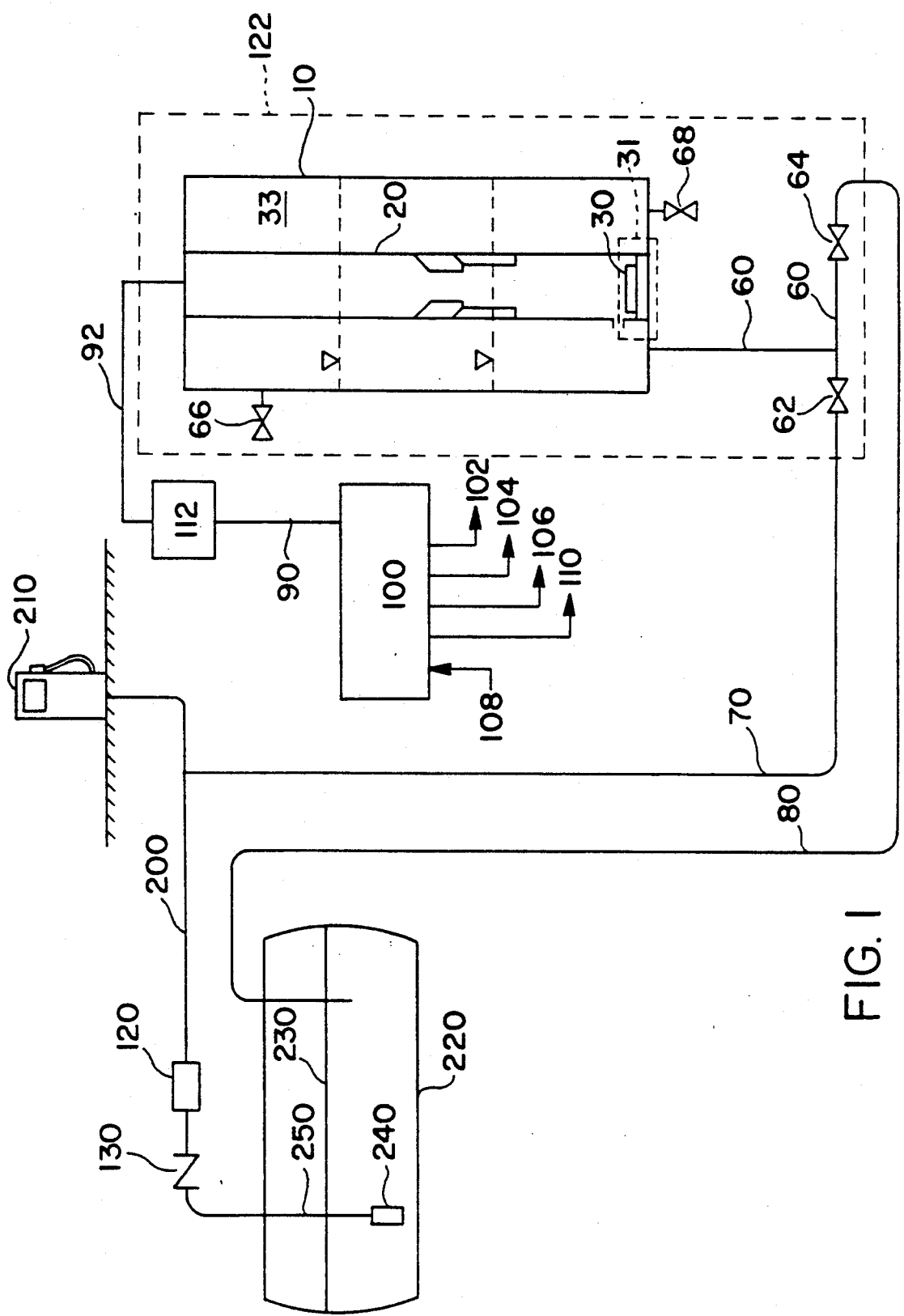

In order to measure the volume change that is due to a leak (i.e., the flow rate), it is necessary to compensate for the temperature-induced volume changes. The present invention compensates for the thermal expansion or contraction of the product in the line without having to measure the temperature of that product. The time it takes to test a line is less than an hour. Unlike most of the methods currently in operation, this new technology is not based on measuring pressure changes in the pipeline system. Instead, it calls for a measurement of the change in the volume of product in the pipeline system. At least two consecutive measurements are made, one at the operating pressure of the line, and the other at zero pressure; for accurate temperature compensation, the pressure must be constant or nearly constant during the measurement. The invention compensates for temperature changes by differencing the volume changes noted during each of these measurements. A high degree of temperature compensation is achieved if the thermally induced volume changes are nearly the same during measurements at each pressure. Since this may or may not be the case, and since there is no way to verify it, a third measurement is made at the same pressure as the first measurement; it is then averaged with the first measurement before the volume changes obtained at zero pressure are subtracted.

The methodology used to measure the temperature-compensated volume rate due to a leak takes advantage of the fact that the flow rate (volume change) due to a leak is not linear with pressure, but the flow rate (volume change) due to temperature fluctuation is. The preferred approach is to make one volume measurement when the line pressure is near zero and a second measurement at a higher pressure, preferably in the vicinity of the operating pressure of the line. At zero pressure, the flow rate due to a leak is zero; thus, the only volume change that occurs is due to thermal expansion and contraction of the product, vapor, or pipeline. The difference between the zero-pressure and the nonzero-pressure measurements represents the thermally compensated flow rate due to a leak at the nonzero pressure.

In general, to determine whether a pipeline system is leaking, the mass flow rate should be estimated from the change in mass of the liquid product in the pipeline system measured over the duration of the leak detection test. For detection of leaks in underground storage tanks and pipelines, it is the industry practice to measure and report the volumetric flow rate estimated from the change in volume of the product in the tank or pipeline system over the duration of the test. For the accuracy required for tests on underground storage tank pipeline systems, the mass flow rate and the volumetric flow rate can be assumed to be approximately equal. The difference between the mass flow rate and the volume flow rate is small, because the liquid product is incompressible at the pressures that an underground storage tank pipeline system is operated and the temperature of the product during a leak detection test does not change sufficiently to change the density of the product. The volumetric flow rate can also be accurately estimated from measurements of the change in the level of the liquid product in a pressure vessel, which is attached to and in communication with the pipeline system and contains both liquid product and trapped gas, during a leak detection test, because level changes can be easily converted to volume changes using a calibration factor. This specification measures and reports volumetric flow rate. There is a wide range of devices that can be used to implement the temperature compensation approach described above. Each device requires a sensing system to measure the change in volume of the product in the line. These devices can use any type of mass, volumetric, level, or density sensing system to measure and report volumetric flow rate. The sensing systems described in this specification measure either volume or level, but mass or density measurement systems could be used interchangably.

In the preferred embodiment of the present invention, a test is conducted at the operating pressure of the line and at a pressure near zero. The basic measurement scheme is to divide the test into three segments of equal length, and to make measurements at one pressure during the first and third segments and measurements at the other pressure during the middle segment. The operating-pressure measurement can be made during the first and third segments and the zero-pressure measurement during the middle segment, or vice versa. The averaging of the two operating-pressure measurements, which bracket the lower or zero-pressure measurement, minimizes any nonlinear changes in the temperature field during the total test period. It is acceptable to use more than three test segments providing the three-segment data collection and data analysis procedures are followed; doing so actually improves the accuracy of the system, and for this reason there is no upper bound on the number of tests. Mathematically, there are a number of equivalent ways to process the multiple-segment data.

This three-segment approach assumes that the product temperature changes determined from averaging the temperature changes during the first and third segments is approximately equal to the temperature changes that occur during the middle segment. This assumption is valid for underground pipelines because the temperature changes in the line tend to increase or decrease exponentially over time when there is a temperature difference between the product in the pipeline and the surrounding ground.

The accuracy of a single test of the line will depend upon (1) the precision of the instrumentation used to measure the volume or volume-related changes in the line, (2) how constant the pressure can be kept during the measurements, (3) the duration of each measurement, (4) the number of data samples used to compute the volume change at each pressure, and (5) the temperature changes that occur in the liquid over the duration of the test.

To improve performance, a multiple-test strategy is used. This minimizes false alarms and missed detections. Three tests are conducted, although the waiting period described below is applied only to the first test. A temperature-compensated volume change is estimated from each three-segment test, or from an average of two or more three-segment tests. Providing that no product has been dispensed between the first and last test sequences, the rate of change of temperature should be decreasing over time, and the volume rate measurement should approach a constant value.

Accuracy can be somewhat degraded if the test is conducted immediately after new product has been brought into the pipeline and if the temperature of this new product is significantly different from that of the surrounding ground. The initial exponential change in temperature that occurs immediately after product is brought into the line is highly nonlinear. Even though a test conducted during this period can still meet the EPA release detection standards, a short waiting period (approximately 15 min) can minimize this nonlinearity and improve performance dramatically. For UST pipeline systems, the waiting period starts immediately after dispensing has ceased.

There are four approaches that can be used to implement this method. The approach taken will depend on the size of the pipeline, the maximum allowable size of the detector, the accuracy of the test, and the cost tradeoffs. These approaches are:

(a) Level sensor and reservoir (Passive Method). A reservoir, in this case a closed pressure vessel, is filled with fluid from the pipeline until the pressure in the vapor space of this container is equal to the line pressure of interest. A sensor is then used to measure changes in the level of the liquid in the vessel. The vessel is designed so that the level changes, and therefore the pressure changes, remain small during the measurement. Measuring the level changes in the vessel requires a high-precision sensor.

(b) Level sensor and reservoir (Active Method). As in the Passive Method, a closed container is partially filled with fluid from the pipeline. The remaining space is filled with a gas and maintained at a constant pressure equal to the line pressure of interest. Again, a sensor is used to measure the changes in the level of the liquid in the container.

(c) Piston-displacement device. An object of known volume is inserted into or removed from the liquid in the pipeline to maintain a constant pressure in the line.

(d) Pump and reservoir. A small, two-way pump is used to move fluid back and forth between the line and a reservoir or container to maintain a constant pressure in the line. The volume changes are measured directly by the pump.

The first two devices measure level changes and convert these to volume changes. If there is no vapor in the line, one can calculate these changes from the geometry of the container; otherwise, one can generate a calibration curve by draining the container and measuring the volume of the liquid taken out of the container. The size of the container used to add or remove liquid from the line should be proportional to the size of the line, the amount of thermally induced volume change, the elasticity properties of the pipeline system, the volume of vapor in the line, and the size of the leak (although the leak is generally responsible for only a fraction of the volume changes contributed by all the other factors listed here). Conversion from level to volume changes is done most easily if the cross section of the container does not change with level. A vertical cylinder is an example of such a container. The reason for keeping the pressure constant during a test is that the pressure changes in the vapor space are small when the level changes are small. The pressure changes in the container can be calculated from the perfect gas law. The vapor acts as a highly elastic spring. Any sensor that can measure liquid level independently of pressure with sufficient precision and accuracy to detect the smallest leak rates of interest will suffice (for example, an acoustic, optical, electromagnetic, or capacitance sensor). For reliable detection of leaks as small as 0.05 gal/h, these level sensors need to have a precision of approximately 0.002 in. or better.

An automatic pipeline leak detection system (PLDS) is illustrated in FIG. 1 as it would be used in an underground storage tank 220 in accordance with the preferred embodiment of the present invention. The PLDS has three main components: the probe assembly 122, a transducer controller 112, and a system controller 100. The transducer controller 112, which is mounted adjacent to the probe assembly 122 within an explosion-proof housing, controls the acoustic transducer 30. The system controller 100 is mounted to an above-ground support and is in electrical communication with the transducer controller 112 through a cable 90. The cable 90 carries power and command data from the system controller 100 to the transducer controller 112, and acoustic data from the transducer controller 112 back to the system controller 100.

The transducer controller 112 contains the pulse waveform shaping, transmitting and receiving, and digital preprocessing electronics for the PLDS system. The system controller 100 contains the remainder of the hardware and software necessary to control the desired operational modes from the transducer controller 112, acquire the acoustic data, process the data in terms of product level, product-level changes, and leak rate, and display the results. The system controller 100 can also be equipped to control other sensor systems, such as those that provide overfill protection and alert, an automatic tank gauging system, detection of leaks in the annular space a double-wall tank, detection of petroleum floating on the groundwater outside the tank, and detection of vapors in the soil and backfill outside the tank.

The transducer 30 is in electrical communication with the transducer controller 112 by means of a conductor 92. With reference to FIG. 2(a), the transducer 30 receives command data from the transducer controller 112 and transmits a series of accurately timed acoustic pulses up the probe, through the product, and to the various fiducials (acoustically reflective targets). Fiducials 24 and 22 comprise the bottom circumference of two concentric thin-walled nylon tubes (the "sleeve") separated in the vertical by a known distance; the nylon sleeve fits into a cylindrical tube, preferably a 1.5-in.-diameter plastic tube, that holds the probe assembly. The lower fiducial 24, $F_1$, is preferably positioned at a height, $h_1$, about 2 in. above the transducer 30, while the upper fiducial 22, $F_2$, is preferably positioned at a height, $h_2$, about 4 in. above the transducer. In operation, acoustic pulses emitted by the transducer 30 are reflected from the fiducials 24 and 22 and from the interface between the product and the vapor, whether the product level is high 40 or low 50.

Referring to FIGS. 1 and 2(a), the probe assembly 122 consists of a cylindrical pressurized vessel 10, the acoustic sensor 31 (which includes the transducer 30 mounted on a base 32, a tube 20 with a hole 26 located near the bottom of the tube, and two fiducials 22 and 24 separated by a known distance and mounted on a sleeve comprised of two concentric nylon tubes 28 and 34), and a series of valves, pipes, and cables linking it to the tank, pipeline and controllers. A valve 62 connects a pipe 60 from the pressure vessel to a pipe 70 attached to the pipeline 200; this valve 62 is the means by which product from the pipeline enters the pressure vessel. Another valve 64 connects the pipe 60 from the pressure vessel to a pipe 80 that drains into the tank 220 or another holding container; this valve 64 is the means by which product is removed from the pressure vessel during a test. The trapped vapor 33 in the pressure vessel is used to maintain a constant or nearly constant pressure during the measurements at each product level in the pressure vessel. An electric cable 92 connects the transducer to its controller unit 112. Because the fluid in the pipeline must be at rest during a leak detection test, the pipeline 200 has a flow switch 120 to monitor whether product from the tank enters the line during a test. It also has a high-performance check valve so that pressure in the line can be maintained during a test. Valves 66 and 68 are used in the calibration of the sensor.

The acoustic sensor 31 (FIG. 2), which measures level changes within the pressure vessel, is housed in a tube 20 that supports both the transducer 30 and the two reference fiducials 22 and 24. The transducer is located at the bottom of the tube, and the fiducials are mounted at a known distance from the transducer on a sleeve (comprised of nylon tubes 28 and 34) that is inserted in the tube above the transducer. A hole 26 near the bottom of the tube allows product from the pressure vessel to enter or leave.

Figure 4B:
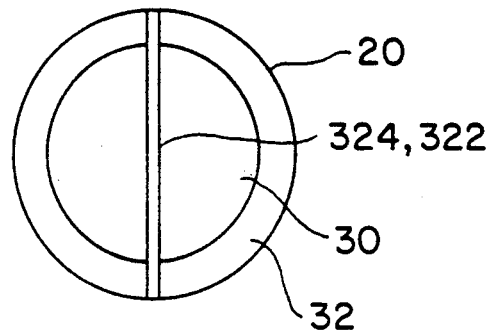

FIGS. 3(a) and 3(b) show another alternative embodiment of the acoustic sensor 31. The fiducials 322 and 324, which are affixed to the tube, are thin bars positioned such that their long axes are perpendicular to the transducer. Four of many acceptable cross-sectional shapes 330, 332, 334, and 336 for the fiducials 322 and 324 are shown in FIG. 4 (a). The triangular bar 330 has the preferred cross-section, because (1) the bottom edge of the bar is flat and perpendicular to the transducer so that the acoustic energy reflected from the fiducial is maximized, and (2) the top edges of the bar are not perpendicular to either the transducer or surface, so that the acoustic energy reflected from the top of the bar is minimized.

Figure 4A:
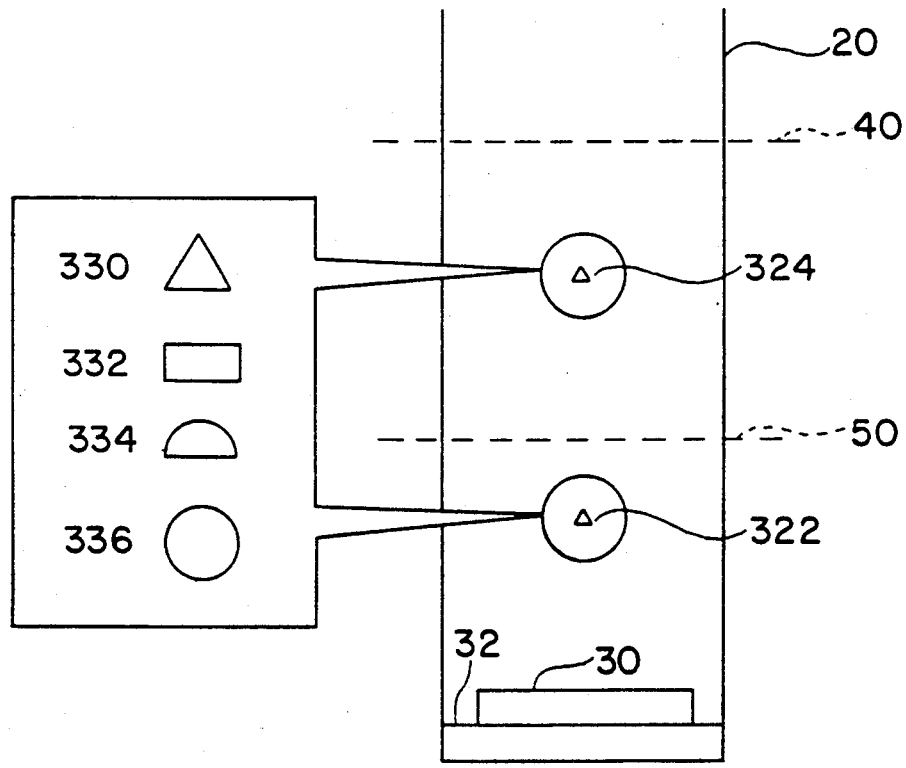

In yet another alternate configuration of the acoustic sensor system (FIG. 5), the transducer and fiducials are not housed in a tube; the transducer 30 is mounted on the bottom of the pressure vessel 10 and the fiducials 342 and 344 are mounted on a rod 340 suspended vertically from the top of the pressure vessel. Some acceptable cross-sectional shapes for the fiducials 342 and 344 are shown in FIG. 4(a).

It is convenient but not absolutely necessary for the pressurized vessel 10 to have a cross-sectional area that does not change with height. A cylinder is preferred, because the height-to-volume conversion factor is then the same regardless of the level of product within the vessel. If the cross-sectional area changes from top to bottom, such as in a spherical vessel, the height-to-volume conversion factors is a function of the level of the product, and a table of conversions is required.

Referring to FIG. 2(a), three measurements are made with the acoustic sensor subsystem 31. First, an estimate of the speed of sound through the product between the transducer and the liquid surface is made; when the speed of sound is known, an acoustic pulse can be used to measure the height of the product in the pressure vessel and to measure the rate of change of level. The pulse travels from the transducer to the fiducial closest to the product surface. The lower fiducial 24 is used to measure sound speed when the product surface is at the lower level 50, and the upper fiducial 22 is used when the product surface is at the higher level 40. The speed of sound with one fiducial can be measured by $$U_i = h_i/(2t_i), \tag{1}$$

where
$U_i$ = the speed of sound in inches/second between the transducer and either the upper fiducial 22 or the lower fiducial 24
$h_i$ = the known distance in inches between the transducer and the upper fiducial 22 or the lower fiducial 24
$t_i$ = the round-trip travel time in seconds between the transducer and the upper fiducial 22 or the lower fiducial 24
i = either 1, which represents measurements made between the transducer and the lower fiducial 24, or 2, which represents measurements made between the transducer and the upper fiducial 22

If the product surface is above the upper fiducial 22, both fiducials can be used, with the following algorithm, to estimate the speed of sound $U_{1-2}$:

$$U_{[1-2]} = \frac{[(h_2 - h_1)]}{[2(t_2 - t_1)]}. \tag{2}$$

Second, an estimate of the surface level of the product in the pressure vessel is made; this ensures that the product is at the correct level, either the higher level 40 for measurements made at the operating pressure of the pipeline or the lower level 50 for measurements made at zero pressure. The liquid level in the pressure vessel changes because of the contraction or expansion of the vapor in the pressure vessel as the pressure in the pipeline system increases or decreases, respectively. This estimate is repeated for each segment of a leak detection test. The height of the surface above the transducer in inches, $h_s$, is then calculated from $$h_s = U_s(t_s)/2, \tag{3}$$

where
$h_s$ = the measured distance, in inches, between the transducer and the product surface 40 or 50
$t_s$ = the round-trip travel time in seconds between the transducer and the product surface 40 or 50
$U_s$ = the speed of sound in inches/second between the transducer and the product surface; $U_s$ is estimated from either $U_i$ (the speed of sound in inches/second between the transducer and the fiducial 22 or 24 that is closest to the product surface) or $U_{1-2}$ (the speed of sound in inches/second between fiducials 22 and 24)

The speed of sound through the product varies as the density of the product changes. For a product of uniform chemical composition, the change in density is dependent on the change in the temperature of the product. As a consequence, the speed of sound through a given product can be accurately determined from the average temperature of the product over the propagation path of the acoustic signal. For the liquids of interest, changes in the speed of sound vary linearly over the range of ambient temperatures that will be encountered during underground pipeline tests and can be determined from $$U = mT + b, \tag{4}$$

where
U = speed of sound speed in meters/second
T = temperature in degrees Centigrade
m = dU/dT in meters/second/degrees Centigrade
b = sound speed in meters/second at T=0 degrees Centigrade Third, the change in the level of the product is determined from $$\delta h_s = 39.37 \left(\frac{U_s}{2}\right)[\delta t_s - \delta t_i], \tag{5}$$

where
$U_s = U_i$ = speed of sound in meters/second between the transducer and the surface; the fiducial closest to the product surface (either fiducial 22 or 24) is used in estimating the speed of sound
$\delta t_s$ = the change over time in the round-trip travel time in seconds between the transducer and the surface
$\delta t_i$ = the change over time in the round-trip travel time in seconds between the transducer and the fiducial closest to the product surface (either fiducial 22 or 24)

The first term in the square brackets in Eq. (5), $\delta t_s$, is a measurement of the product-level changes, and the second term, $\delta t_i$, is used to correct the level changes for errors due to sound speed changes. The product in the pressure vessel is subject to thermal expansion and contraction. In general, however, no correction is made for this phenomenon because the error associated with it is usually smaller than the precision required of the sensor for measuring level changes. If the pressure vessel were large or if the temperature changes of the product in the vessel were great, the height changes would be estimated with the following equation, which compensates for the thermal expansion and contraction of the product in the pressure vessel:

$$\delta h_s = 39.37 \left(\frac{U_s}{2}\right)\left[\delta t_s - \delta t_i - \left(\frac{V}{A}h\right)C_e t_s \Delta T\right]. \tag{6}$$

where
V = volume, in cubic inches, of the product in the pressure vessel at a surface height of h
h = height, in inches, of the liquid surface in the pressure vessel above the transducer
A = cross-sectional area, in square inches, of the surface of the product in the pressure vessel at a height of h above the transducer
$C_e$ = coefficient of thermal expansion of the liquid in the pressure vessel
$\Delta T$ = change in the average weighted temperature between the transducer and the fiducial that is located closest to the product surface during the measurement An estimate of the average temperature change is made from $$\Delta T = -\frac{\delta t_i}{t_i}\left(\frac{1}{U_s}\frac{dU}{dT}\right)^{-1}, \quad (7)$$

where $t_i$ is the round-trip travel time between the transducer and either fiducial 22 or 24. The third term in Eq. (6), involving $\Delta T$, is the one that compensates for the thermal expansion and contraction of the product in the pressure vessel.

An alternative yet similar equation that can be used to estimate the temperature-compensated level changes in the pressure vessel is $$\delta h_s = \frac{U_s}{2}\left(\delta t_s - t_s\frac{\delta t_i}{t_i} - \left(\frac{V}{A}h\right)C_e t_s \Delta T\right). \quad (8)$$

The only difference between Eqs. (6) and (8) is the term that is used to correct the level changes for sound speed. Once the speed of sound through the layer of product between the transducer and the fiducial 22 or 24 has been estimated, the quantity $(t_s/t_i)$ in Eq. (8) is used to extrapolate that estimate to the layer of product between this fiducial 22 or 24 and the surface. Another method of estimating $\delta h_s$ is to use the speed of sound through the layer of product between the two fiducials 22 and 24 when the product is at the higher level 40 and above the higher fiducial 22 to estimate the sound speed changes in the layer above this upper fiducial 22. This method uses $$\delta h_2 = \frac{U_s}{2}\left(\delta t_s - \left(\frac{V}{A}h\right)C_e t_s \Delta T\right) - \frac{\delta t_i}{2t_s}(t_i U_s + (t_s - t_i)U_{1-2}), \quad (9)$$

where $U_{1-2}$ = speed of sound between fiducials 22 and 24.

Figure 2B:
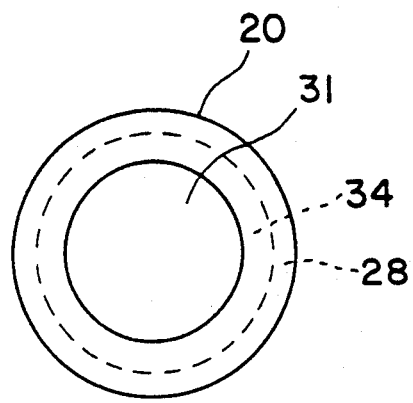
Figure 2A:
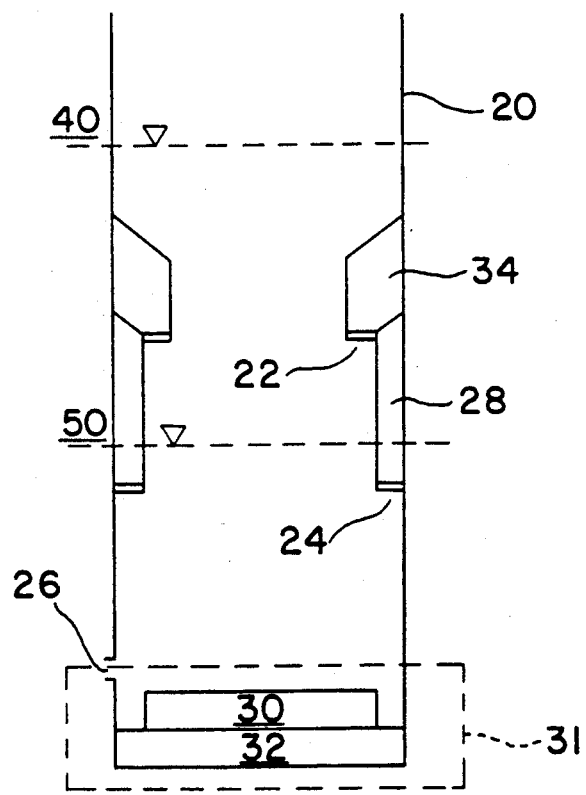

The protocol for conducting a pipeline leak detection test with the preferred embodiment of the invention shown in FIGS. 1 and 2 is as follows:

1. During the installation of the leak detection system, it is determined what the height of the liquid in the pressure vessel 10 will be (1) when the pressure is zero and (2) when the pressure is at another, higher level that will be used during a test. This is done as follows. The first step is to establish the height of the product when the pressure is zero (i.e., atmospheric). All valves 62, 64, 66 and 68 are closed except for the one 62 that allows product to enter the pressure vessel from the pipeline 200 via connecting lines 70 and 60. Valve 62 is then closed and valve 66 is opened, allowing the vessel to come to atmospheric pressure. The valve 64 at the juncture of the connecting lines 60 and 80 is then opened, allowing product to drain from the pressure vessel into the tank or other appropriate holding container until the level of the product in the vessel falls to a point as close as possible to, but still above, fiducial 24. Valve 64 is closed. Next valve 62 is opened and a submersible pump 240 is turned on and allowed to pressurize the pipeline 200. The pressurized product from the pipeline flows into the pressure vessel via connecting line 70 and rises to the upper level 40 (pipeline pressure greater than zero). If the pressure vessel and the fiducials have been properly designed, the level should rise above the upper fiducial 22 until it is approximately the same distance from this fiducial as it was from the lower fiducial 24 when the pressure was zero. Once the levels have been checked by means of Eq. (3), a calibration can be performed to establish the height-to-volume conversion factor for the system.

2. The height-to-volume conversion factor, which relates the level of the product in the vessel to a corresponding volume, is then determined. When the pressure in the vessel 10 is zero, valve 68 is opened and a known quantity of product is removed from the container. The change in level resulting from this change in volume is measured with the acoustic transducer 30. The height-to-volume conversion factor is obtained by dividing the volume change by the level change.

3. A leak detection test is initiated from the system controller 100. The system controller instructs the submersible pump 240 via cable 110 to pressurize the pipeline 200. However, no product is dispensed from the line. The system controller then opens valve 62 via cable 102 to allow product from the pipeline to enter the pressure vessel until it reaches the upper level 40 and the pressure in the vapor space 33 is the same as that in the pipeline. The pump is then turned off via a command from the system controller 100 via cable 110. The height of the product in the pressure vessel is then checked. It should be above the upper fiducial 22 at the upper level 40.

4. The system controller 100 then instructs the transducer controller 112 to collect data on level changes over a specified period of time, nominally 5 min. The rate of change of the level is calculated by fitting a least-squares line to the data. The slope of the line, when multiplied by the height-to-volume conversion factor, is the rate of change of volume at the higher pressure.

5. The system controller 100 then lets the pressure in both the pipeline 200 and the pressure vessel 10 drop to zero by opening valve 64 via cable 104. When zero pressure has been reached, another check on the height of the product is made. It should now be above fiducial 24 at the lower level 50.

6. The system controller 100 then instructs the transducer controller 112 to collect data on level changes over a period of time identical to the one used in step 4 (for the high-level measurements). The rate of change of the level is calculated by fitting a least-squares line to the data. The slope of the line, when multiplied by the height-to-volume conversion factor, is the rate of change of volume at the zero pressure.

7. The system controller then closes valve 64 via cable 104, opens valve 62 via cable 102, and instructs the submersible pump 240, via cable 110, to pressurize the pipeline system. Again, the level of product in the pressure vessel rises until the pressure in the vessel is the same as that in the pipeline. The height of the product in the pressure vessel is again checked. Then the system controller 100, via cable 110, turns off the submersible pump and instructs the acoustic transducer controller 112 to collect data on level changes over a specified period of time. The rate of change of the level is calculated by fitting a least-squares line to the data. The slope of the line, when multiplied by the height-to-volume conversion factor, is the rate of change of volume at the higher pressure (being measured now for the second time).

8. Via cable 108, the system controller 100 checks the flow switch 120 continuously throughout the test to determine whether any product is being dispensed. If there has been no flow, data analysis can proceed. If there has been flow, the test is terminated.

9. Thermal fluctuations in the rate of change of volume must be compensated for. The temperature-compensated volume rate is calculated as follows. The average of the two measurements of the rate of change of volume obtained when product is under pressure and at the upper level 40 is subtracted from the rate obtained when the pressure is zero and the product is at the lower level 50.

10. If the temperature-compensated volume rate exceeds a predetermined threshold, the pipeline may be leaking.

11. If in the first test, the threshold is exceeded, two more tests identical to the one described above are conducted. It is determined on the basis of the last two tests whether the line should be declared leaking. In this way the possibility of false alarms is reduced.

Figure 5B:
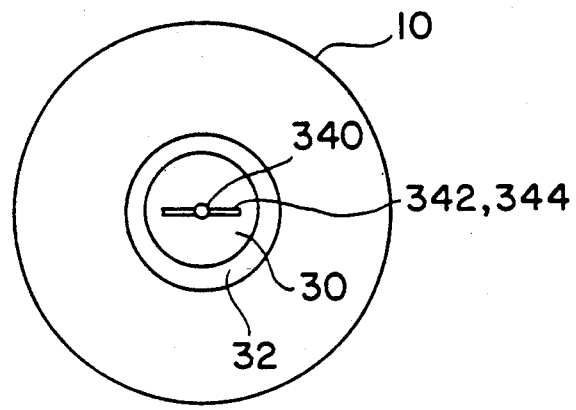
Figure 5A:
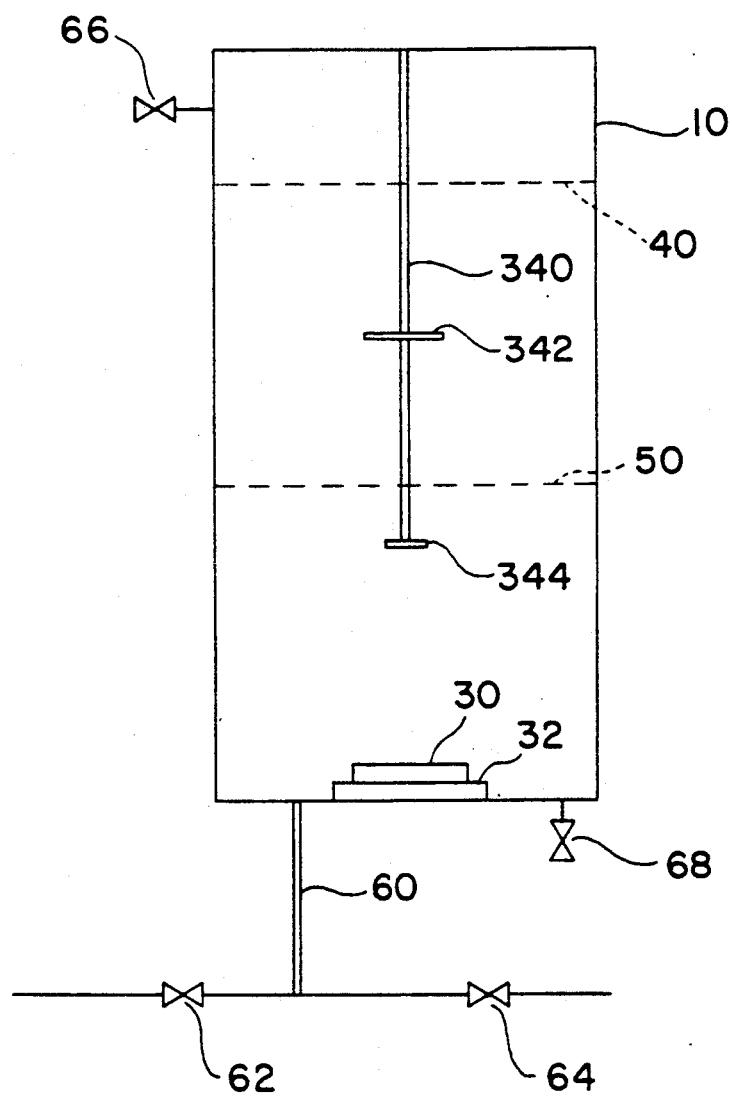
Figure 6:
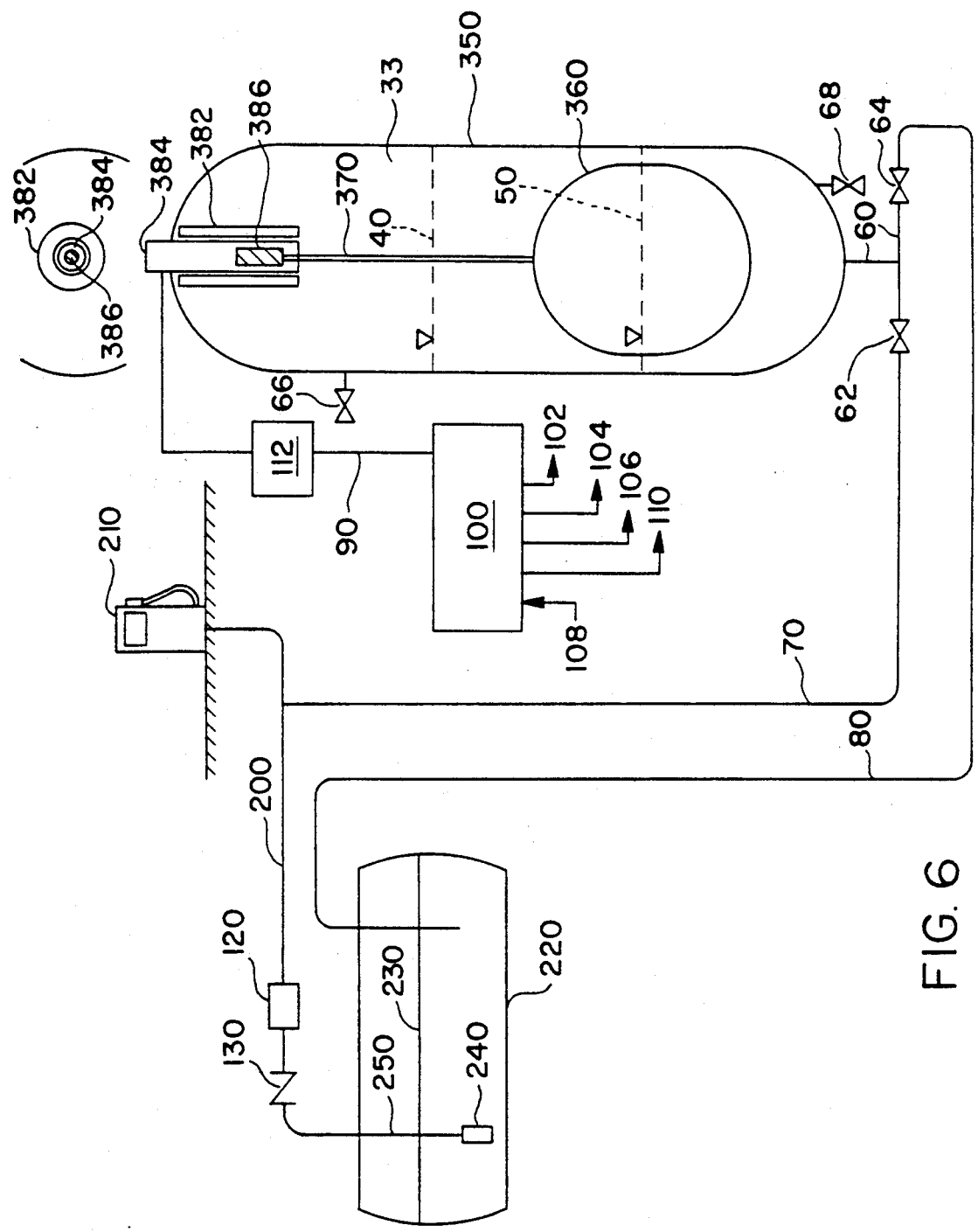
Figure 7:
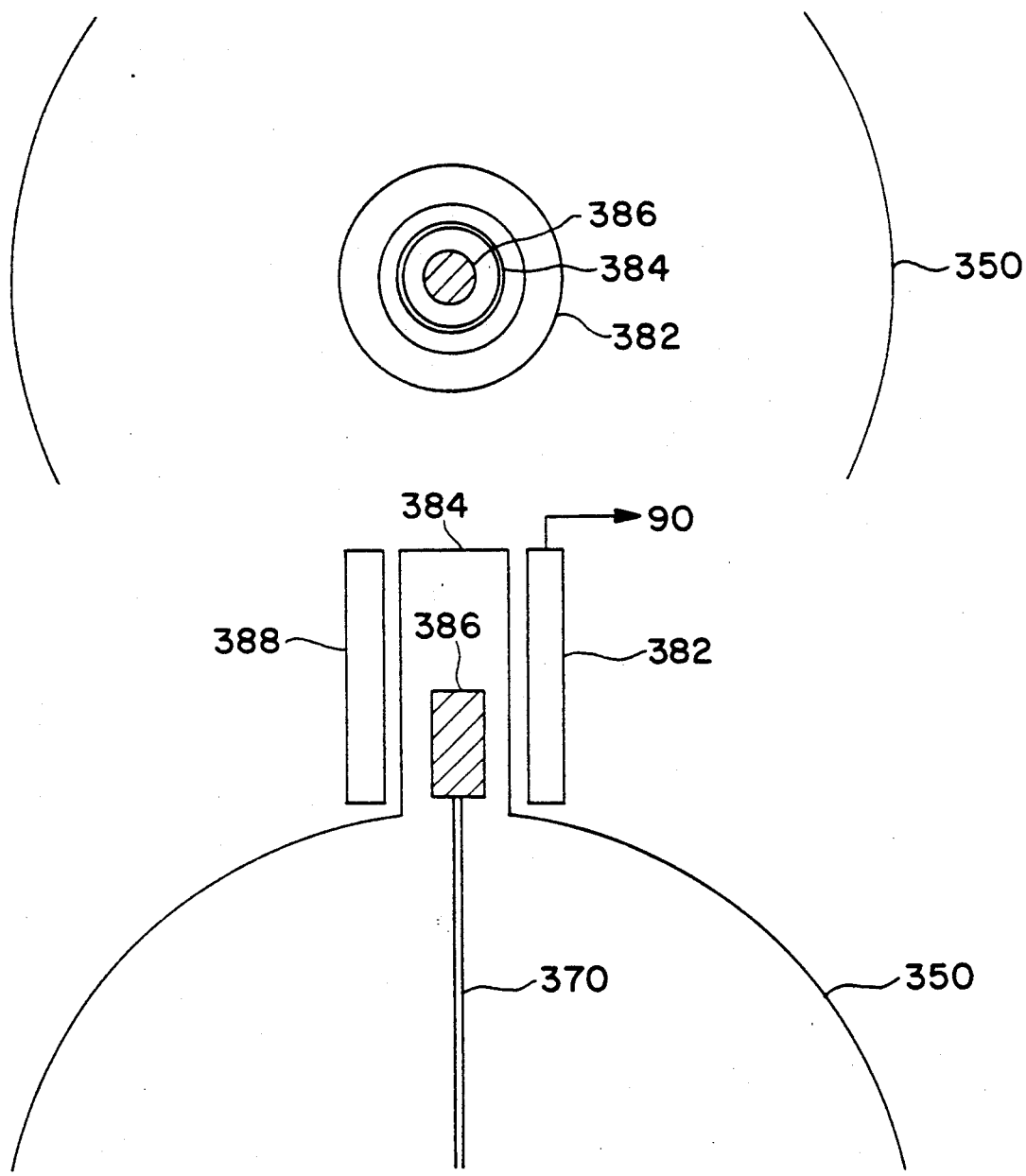

The test procedure is identical for the alternative embodiments, shown in FIGS. 3 through 5, that use an acoustic sensor, and for the alternative embodiments shown in FIGS. 6 and 7 in which the level changes are measured with a linear variable-differential transformer (LVDT) rather than with an acoustic system.

The primary function of the acoustic sensor 31 is to measure the level of the product in the pressure vessel and to detect and measure any changes in this level. Any level-measurement sensor system can be used providing it has sufficient accuracy, precision and resolution to meet the performance standard for measuring level and changes in level. The acoustic sensor 31 shown in FIGS. 1 through 5 has been replaced in FIG. 6 by a system 380 that uses an electromagnetic float 360 to track the surface. The float 360 is attached to a vertical rod 370 that in turn is attached to a cylinder 386 with a ferromagnetic core; the cylinder moves up and down inside a linear variable-differential transformer (LVDT) 382, a commercially available device. The LVDT measures the change in the magnetic field as the cylinder 386 moves up and down. Level changes of better than 0.001 in. can be measured. The length of the LVDT depends on the difference in the levels 40 and 50 to be measured. The LVDT can be completely contained within the pressure vessel as shown in FIG. 6, located on top of the pressure vessel as shown in FIG. 7, or placed in any position in between. The LVDT measures only level changes, so in order to measure absolute height, the changes in level must be continuously summed by the system controller 100. Although the shape of the float does not affect the performance of the measurement system, the vertical dimension of the pressure vessel can be minimized if the shape of the float matches the shape of the vessel. To minimized evaporation and condensation effects, the float should have a cross-sectional area nearly as wide as that of the pressure vessel.

The present invention quantitatively estimates the flow rate from a leak at the operating pressure of the pipeline; compensates for thermal expansion and contraction of both the product and the pipeline without the need for measuring temperature directly; can conduct a leak detection test in a short time (approximately 15 min); is self-calibrating, because it measures volume directly, or measures level changes, which can easily be converted to volume changes from the height-to-volume calibration measurements or from the cross-sectional area of the pressure vessel; only requires level or volume measurement sensors are required in order for the invention to measure volume changes, to change the pressure in the pipeline, and to keep the pressure constant during a test; and increases its performance of the invention increases when a multiple-test strategy is used.

5 DESCRIPTION OF ALTERNATIVE EMBODIMENTS

Figure 8:
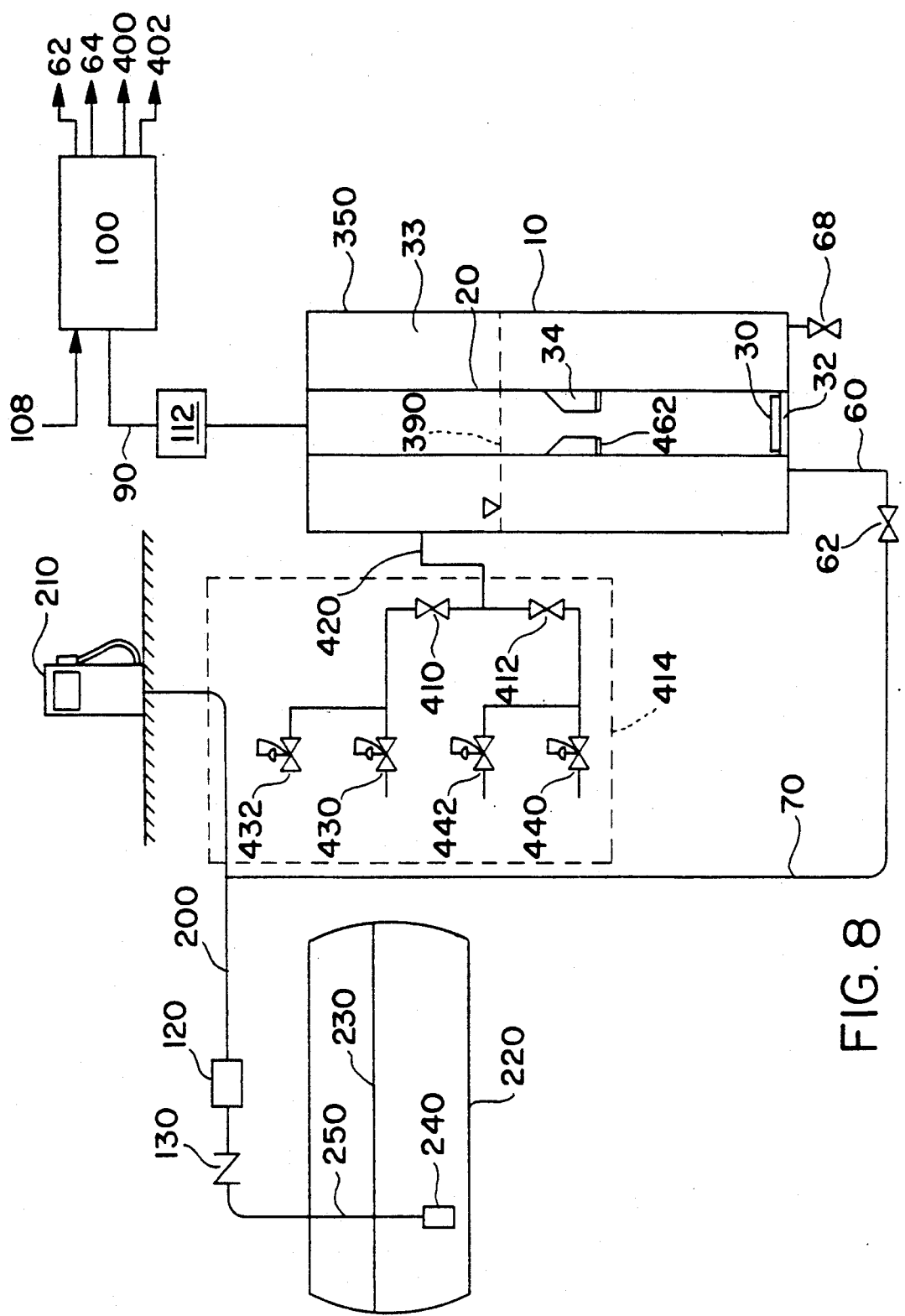
FIG. 8 shows a second alternative embodiment of the pipeline leak detection system in which a pressure regulator and a container of inert gas are used to keep the pressure constant in the vessel that contains the acoustic sensor system.
Figure 9:
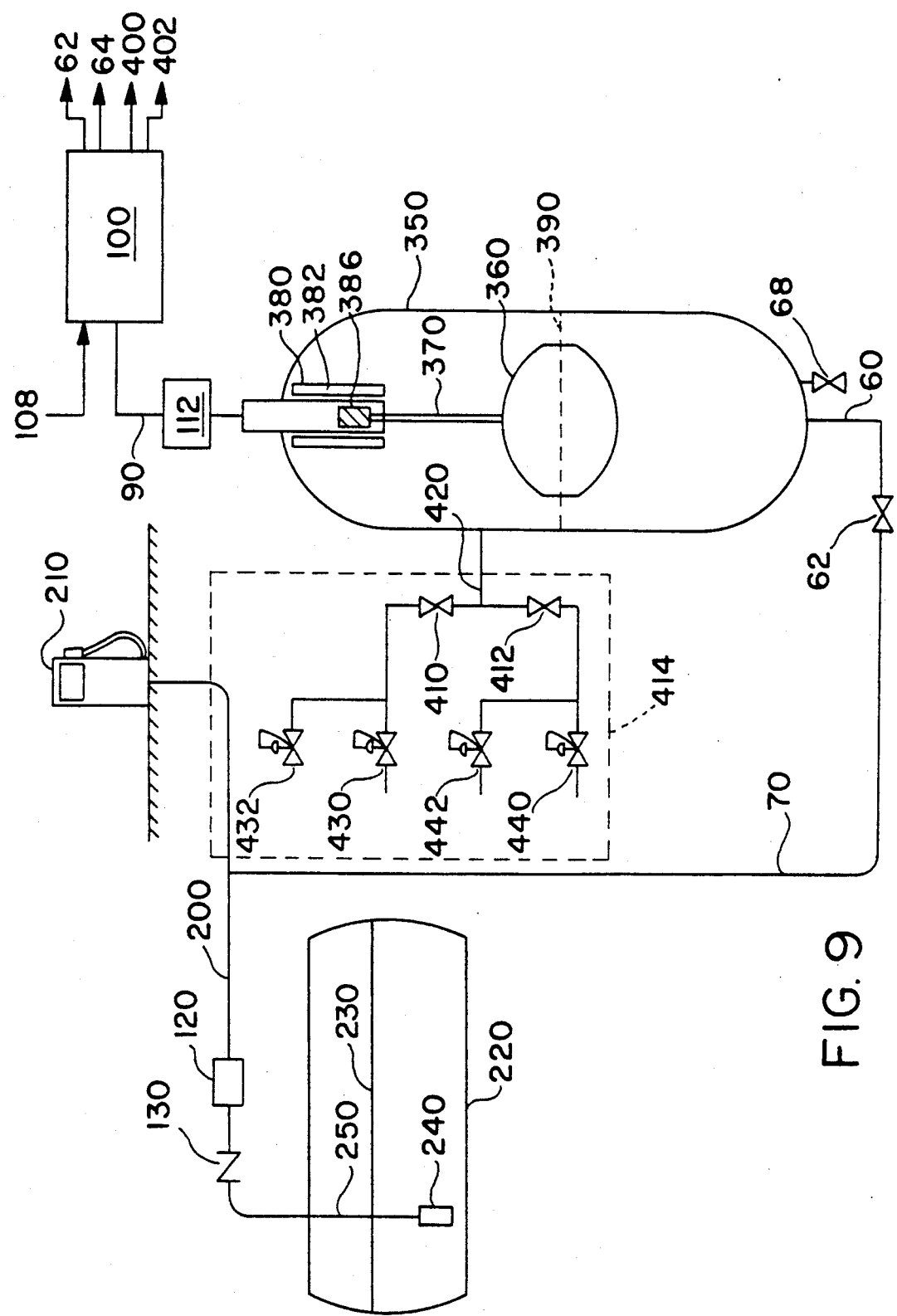
FIG. 9 shows a third alternative embodiment of the pipeline leak detect system in which the acoustic sensor system shown in FIG. 8 has been replaced by an electromagnetic sensor system.

Four alternative embodiments of the present invention are shown in FIGS. 8 through 11. Each of these embodiments measures the volume changes at zero pressure and at the operating pressure of the line, keeping the pressure constant during these measurements. The three-segment procedure is then used to compute the temperature-compensated volume rate. The devices shown in FIGS. 8 and 9 measure level changes in a pressure vessel, while those in FIGS. 10 and 11 measure volume changes directly. The devices shown in FIGS. 8 and 9 are nearly identical to the ones shown in FIGS. 1 and 6, except that a pressure-regulating subsystem 414 is used to raise and lower the pressure within the vapor space and to maintain a constant pressure within the vessel. The devices shown in FIGS. 1 and 6 maintain constant pressure without any additional devices, while the ones in FIGS. 8 and 9 include a device intended for this purpose. The pressure-regulating subsystem 414 consists of a pipe 420 connecting the gas in the pressure vessel to either a high- or low-pressure regulator. When the valve 410 is opened, an inert gas enters the pressure vessel 350. This gas is used to establish and maintain constant pressure at the higher level. If the pressure in the vessel drops below this level, a regulator 430 raises it; if the pressure rises, another regulator 432 lowers it appropriately. When the valve 412 is opened, the inert gas is allowed to escape; thus, the gas is also used to establish and maintain a pressure of zero in the vessel 350. If the pressure in the vessel drops below zero, a regulator 440 raises it back to zero; conversely, if the pressure rises above zero, a regulator 442 lowers it back to zero. The acoustic sensor subsystem in FIG. 8 requires only one fiducial 462, which is located as close as possible to the underside of the surface of the product 390 in the pressure vessel. The device in FIG. 9 is identical to the one in FIG. 8 except that the acoustic transducer measurement system has been replaced by an electromagnetic float system like the one described in FIG. 6.

The test procedure for the alternative embodiments shown in FIGS. 8 and 9 is very similar to that for the embodiments shown in FIGS. 1 and 6, except that the pressure in the pipeline 200 and the vapor space 33 in the pressure vessel is controlled with a pressure-regulating subsystem 414. The higher pressure is maintained constant during both measurements (Steps 4 and 7) by the high 430 and low 432 regulators, and the zero pressure (Step 6) is maintained by two additional high and low regulators 440 and 442.

Figure 10:
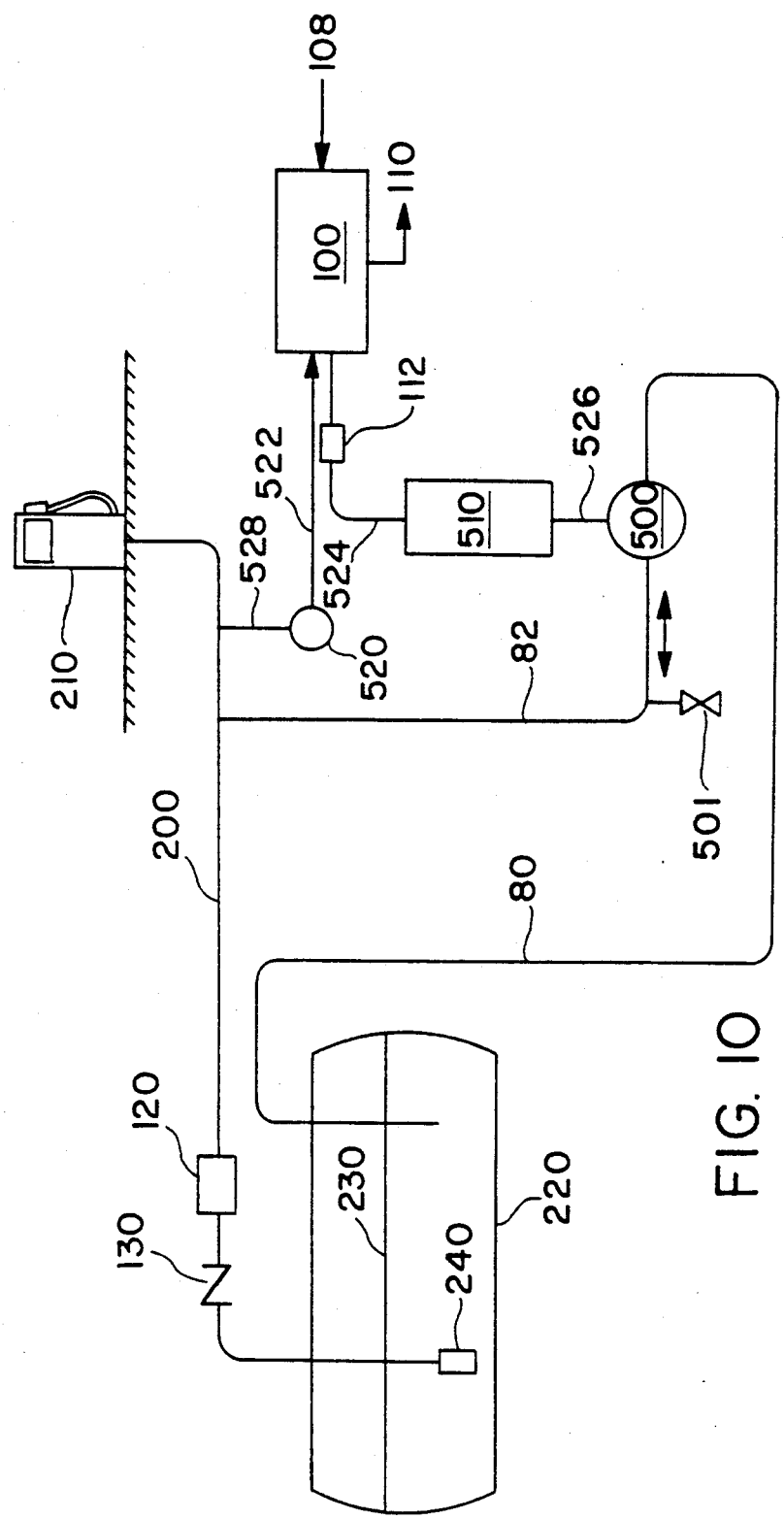
FIG. 10 shows a fourth alternative embodiment of the pipeline leak detection system in which the pressure vessel and pressure regulator in FIGS. 8 and 9 have been replaced by a pressure sensor and a positive displacement pump that is used to pump liquid into or out of the pipeline as a means of keeping the pressure constant.
Figure 11:
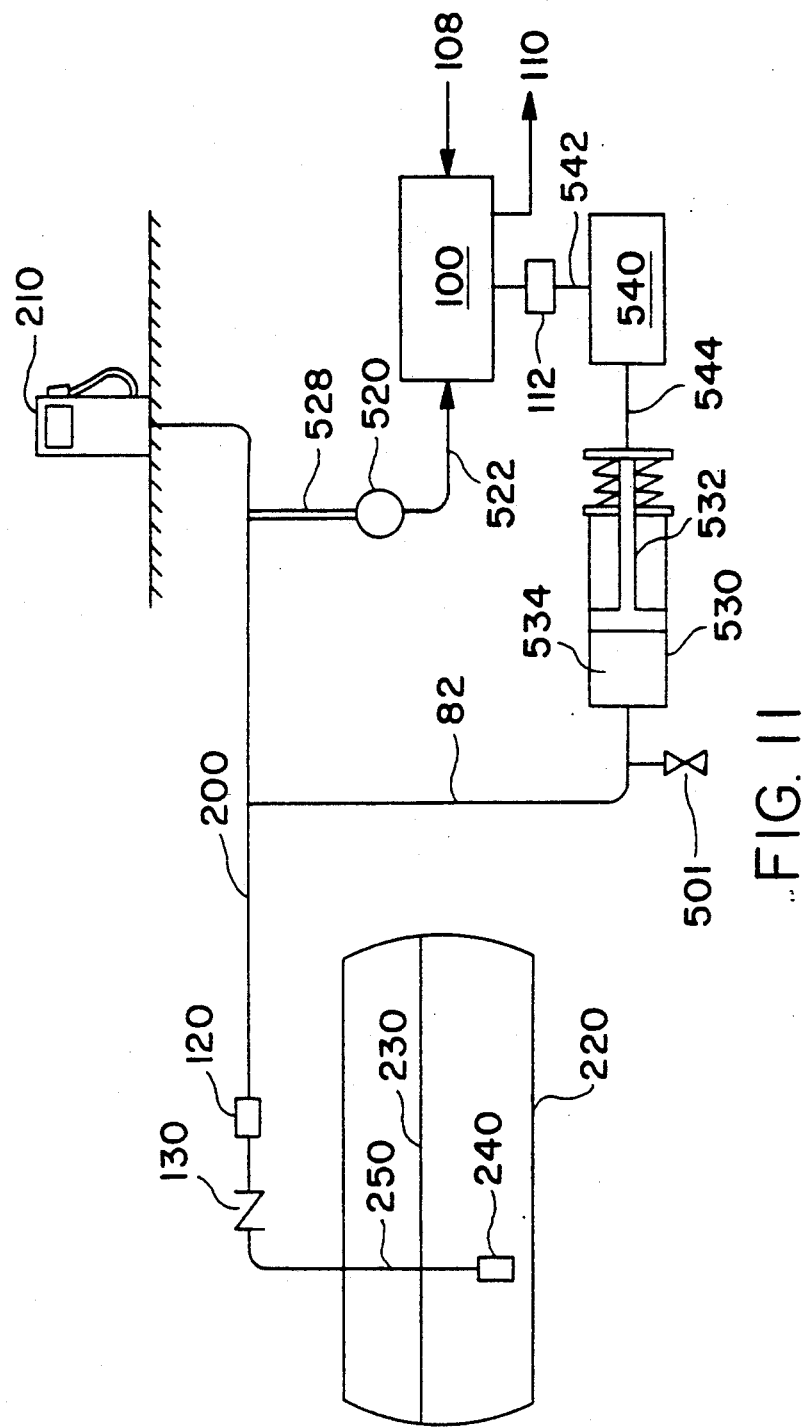
FIG. 11 shows a fifth alternative embodiment of the pipeline leak detection system in which the positive displacement pump in FIG. 10 has been replaced by a piston that is used to displace a volume of liquid in the pipeline as a means of keeping the pressure constant.

FIGS. 10 and 11 show a measurement system that maintains a constant pressure by adding or removing a known volume of product from the pipeline, and that then sums the volume changes. In FIG. 10, the sensor 122 (shown in FIG. 1) is replaced by positive-displacement pump 500, a motor 510, and a pressure sensor 520. Product is added to the pipeline 200 through a pipe 82 or removed from the pipeline through a drain line 80.

The valve 501 is used to calibrate the positive-displacement pump 500 and motor 510. The pressure sensor 520, which is connected to the pipeline via a pipe 528, is used to maintain the proper pressure conditions during a test. The controller 100, which is connected electrically to the pressure sensor via a cable 522 and to the motor 510 and positive-displacement pump 500 via cables 524 and 526, establishes both the high pressure and the zero pressure and maintains pressure by reading the pressure sensor and turning the displacement pump's motor on or off. When the pump removes product from the pipeline 200, the pressure in the line drops. When the pump adds product to the pipeline, the pressure rises. The volume change in the line at the higher pressure or at zero pressure is measured directly by the pump 500.

The device in FIG. 11 is substantially the same as the one in FIG. 10, except that the motor 510 and positive-displacement pump 500 have been replaced by a displacement piston device 530 and a linear actuator 540. The linear actuator is connected to the system controller 100 via a cable 542 and to the displacement piston 530 via another cable 544. The motor and positive displacement pump have been replaced by a displacement device 530 that uses a piston 532 to displace a known volume of fluid in the containment volume 534. The volume changes are determined directly from the movement of the piston 532.

The alternative embodiment of the invention shown in FIG. 10 measures volume changes directly. The protocol for conducting a pipeline leak detection test with this embodiment is as follows:

1. The motor 510 and positive-displacement pump 500 in FIG. 10 are calibrated over the range of volume measurements expected during a test. This is done by withdrawing known amounts of liquid from the line 82 via valve 501 and measuring the resulting change in volume. An alternative location of the valve 501 is in the line 80 connecting the pump 500 to the container or tank 220. A calibration curve is then generated by fitting a least-squares line to the data that identify the measured volume and the actual volume withdrawn from the line.

2. A leak detection test is initiated from the system controller 100. The system controller instructs the submersible pump 240 via cable 110 to pressurize the pipeline 200. Once the test pressure is reached ("test pressure" meaning the one higher than zero), a command from the system controller turns off the submersible pump via cable 110.

3. The system controller 100 then instructs the transducer controller 112 to record data on the change in volume over a specified period of time, nominally 5 min. The pressure in the pipeline is measured via the pressure sensor 520, and the system controller maintains a constant pressure in the pipeline by providing instructions to the motor 510 and positive-displacement pump 500 to add or remove product to maintain this pressure at a constant level during the test. The rate of change of volume is calculated by fitting a least-squares line to the data. The slope of the line is the rate of change of volume at the higher pressure.

4. The positive-displacement pump 500 removes product via the drain line 80 until the pressure in both the pipeline 200 and the pressure vessel 10 drops to zero. This is confirmed by the pressure sensor.

5. The system controller 100 then instructs the transducer controller 112 to record data on the change in volume over a period of time identical to the one used in Step 3 (for the high-pressure measurements). The rate of change of volume is calculated by fitting a least-squares line to the data. The slope of the line is the rate of change of volume at the higher pressure.

6. The system controller 100 then pressurizes the pipeline 200. Via cable 110 it instructs the submersible pump 240 to add product to the pipeline until the desired pressure has been reached. The system controller then turns off the submersible pump and activates the motor 510 and the positive-displacement pump 500, which adds or removes product from the pipeline 200 over the specified period of time so that the pressure remains constant during this measurement, as verified by the sensor 520. The rate of change of level is calculated by fitting a least-squares line to the data. The slope of the line is the rate of change of volume at the higher pressure (being measured now for the second time).

7. Via cable 108 the system controller 100 checks the flow switch 120 continuously throughout the test to determine whether any product is being dispensed. If there has been no flow, data analysis can proceed. If there has been flow, the test is terminated.

8. Thermal fluctuations in the rate of change of volume must be compensated for. The temperature-compensated volume rate is calculated as follows. The average of the two measurements of the rate of change of volume obtained when the line is pressurized is subtracted from the rate obtained when the pressure is zero.

9. If the temperature-compensated volume rate exceeds a predetermined threshold, the pipeline may be leaking.

10. If, in the first test, the threshold is exceeded, two more tests identical to the one described above are conducted. It is determined on the basis of the last two tests whether the line should be declared leaking. In this way the possibility of false alarms is reduced.

The alternative embodiment of the invention shown in FIG. 11 also measures volume changes directly. The protocol for conducting a pipeline leak detection test with this embodiment is similar to the embodiment shown in FIG. 10 and is as follows:

1. The displacement piston device 530 and linear actuator 540 in FIG. 11 are calibrated over the range of volume measurements expected during a test. This is done by withdrawing known amounts of liquid from the line 82 via valve 501 and measuring the resulting change in volume. A calibration curve is then generated by fitting a least-squares line to the data that identify the measured volume and the actual volume withdrawn from the line.

2. A leak detection test is initiated from the system controller 100. The system controller instructs the submersible pump 240 via cable 110 to pressurize the pipeline 200. Once the test pressure is reached ("test pressure" meaning the one higher than zero), a command from the system controller turns off the submersible pump via cable 110.

3. The system controller 100 then instructs the transducer controller 112 to record data on the change in volume over a specified period of time, nominally 5 min. The pressure in the pipeline is measured via the pressure sensor 520, and the system controller maintains a constant pressure in the pipeline by providing instructions to the displacement piston device 530 and linear actuator 540 to add or remove product to maintain this pressure at a constant level during the test. The rate of change of volume is calculated by fitting a least-squares line to the data. The slope of the line is the rate of change of volume at the higher pressure.

4. The displacement piston device 530 removes product from the pipeline via the line 82 until the pressure in both the pipeline 200 and the pressure vessel 10 drops to zero. This is confirmed by the pressure sensor.

5. The system controller 100 then instructs the transducer controller 112 to record data on the change in volume over a period of time identical to the one used in Step 3 (for the high-pressure measurements). The rate of change of volume is calculated by fitting a least-squares line to the data. The slope of the line is the rate of change of volume at the higher pressure.

6. The system controller 100 then pressurizes the pipeline 200. Via cable 110 it instructs the submersible pump 240 to add product to the pipeline until the desired pressure has been reached. The system controller then turns off the submersible pump and activates the displacement piston device 530 and linear actuator 540, which adds or removes product from the pipeline 200 over the specified period of time so that the pressure remains constant during this measurement, as verified by the sensor 520. The rate of change of level is calculated by fitting a least-squares line to the data. The slope of the line is the rate of change of volume at the higher pressure (being measured now for the second time).

The remaining steps necessary to complete a test are the same as steps 7 through 10 are identical to those described above for the motor 510 and displacement pump 500 in FIG. 10.

What is claimed is:

1. A method for measuring the change in the temperature-compensated flow rate produced by a leak while compensating for the thermally induced volume changes in a pressurized pipeline system containing a liquid product, comprising:
   (a) pressurizing said pipeline system to a first pressure and measuring those changes in the volume of product in said pipeline that are required to maintain approximately constant pressure over a first measurement period;
   (b) changing the pressure in said pipeline to a second pressure and measuring those changes in the volume of product in said pipeline that are required to maintain approximately constant pressure over a second measurement period equal in duration to the first measurement period;
   (c) changing the pressure in said pipeline until it is equal to the pressure during the first measurement period over a period equal in duration to the time required to change the pressure to the second pressure, and measuring those changes in the volume of product in said pipeline that are required to maintain approximately constant pressure over a third measurement period equal in duration to the first measurement period;
   (d) computing the temperature-compensated change of volume by subtracting the change of volume during the second measurement period from the average change of volume during the first and third measurement periods; and
   (e) computing the rate of change of temperature-compensated volume an dividing by the duration of the first measurement period.

2. The method of claim 1, wherein the pressure at which volume change data is collected during said second measurement period is approximately atmospheric pressure.

3. The method of claim 1, wherein the pressure at which volume change data is collected during said first and third measurement periods is approximately atmospheric pressure.

4. A method for measuring the temperature-compensated flow rate produced by a leak while compensating for the thermally induced volume changes in a pressurized pipeline system containing a liquid product, comprising:
   (a) pressurizing said pipeline system to a first pressure which is above atmospheric pressure, and measuring those changes in the volume of product in said pipeline that are required to maintain approximately constant pressure over a first measurement period;
   (b) changing the pressure in said pipeline to a second pressure which is approximately atmospheric pressure, and measuring those changes in the volume of product in said pipeline that are required to maintain approximately constant pressure over a second measurement period of equal duration to the first measurement period;
   (c) changing the pressure in said pipeline until it is equal to the first pressure over a period equal in duration to the time required to change the pressure to the second pressure, and measuring those changes in the volume of product in said pipeline that are required to maintain approximately constant pressure over a third measurement period of equal duration to the first measurement period;
   (d) computing the temperature-compensated change of volume by subtracting the change of volume during the second measurement period from the average change of volume during the first and third measurement periods; and
   (e) computing the rate of change of temperature-compensated volume and dividing by the duration of the first measurement period.

5. The method of claim 4, further comprising the step of comparing said temperature-compensated change of volume to a threshold value to determine whether said pipeline has a leak.

6. A method for measuring the temperature-compensated flow rate produced by a leak while compensating for the thermally induced volume changes in a pressurized pipeline system containing a liquid product, comprising:
   (a) pressurizing said pipeline system to a first pressure which is approximately atmospheric pressure, and measuring those changes in the volume of product in said pipeline that are required to maintain approximately constant pressure over a first measurement period;
   (b) changing the pressure in said pipeline to a second pressure which is above atmospheric pressure, and measuring those changes in the volume of product in said pipeline that are required to maintain approximately constant pressure over a second measurement period of equal duration to the first measurement period;
   (c) changing the pressure in said pipeline until it is equal to the first pressure over a period equal in duration to the time required to change the pressure to the second pressure, and measuring those changes in the volume of product in said pipeline that are required to maintain approximately constant pressure over a third measurement period of equal duration to the first measurement period;

(d) computing the temperature-compensated change of volume by subtracting the change of volume during the second measurement period from the average change of volume during the first and third measurement periods; and (e) computing the rate of change of temperature-compensated volume and dividing by the duration of the first measurement period.

7. The method of claim 6 further comprising the step of comparing said temperature-compensated change of volume to a threshold value to determine whether said pipeline has a leak.

8. The method of claim 1, wherein the steps of pressurizing said pipeline further comprise:

(a) connecting said pressure vessel and said storage container with valve means, said storage container maintained at approximately atmospheric pressure;

(b) lowering the pressure in said pipeline system by removing liquid product from said pressure vessel by opening said valve means and allowing product to drain from said pressure vessel and pipeline system into said storage container until the pressure in said pipeline system reaches a desired lower pressure; and (c) raising the pressure in said pipeline system by adding liquid product to said pressure vessel from said storage container with pump means, by opening said valve means and pumping product into said pressure vessel and pipeline system until the pressure in said pipeline system reaches a desired higher pressure.

9. The method of claim 1, wherein the steps of pressurizing said pipeline further comprise:

(a) adding a gas through regulator means until the pressure in the pipeline system reaches a desired higher pressure; and (b) removing said inert gas through said regulator means until the pressure in the pipeline system reaches a desired lower pressure.

* * * * *